June 2, 1936.                E. O. SCHJOLIN                2,043,011
RUBBER SUSPENSION SYSTEM
Filed Sept. 3, 1935                2 Sheets-Sheet 2

Inventor
Eric Olle Schjolin
By Blackmore, Spencer & Flick
Attorneys

Patented June 2, 1936

2,043,011

UNITED STATES PATENT OFFICE 2,043,011

RUBBER SUSPENSION SYSTEM

Eric Olle Schjolin, Pontiac, Mich., assignor to General Motors Corporation, Detroit, Mich., a corporation of Delaware Application September 3, 1935, Serial No. 38,953

5 Claims. (Cl. 267—21)

This invention relates to an improvement in the suspension of vehicles upon road wheels.

One of the objects of the invention is to provide a springing system in which the load is resiliently carried by rubber or other elastic non-metallic material. More particularly it is proposed to provide a load supporting structure of relatively small bulk with every particle of the rubber doing an equal share of the work for which it is intended.

A further and important object is to provide a rubber torsion joint involving a rubber sleeve surface bonded to inner and outer relatively movable members with knife edge bearings between the members so arranged that the resultant of the bearing force reactions are directed through them to relieve the rubber sleeve of excessive overloading.

Figure 1:
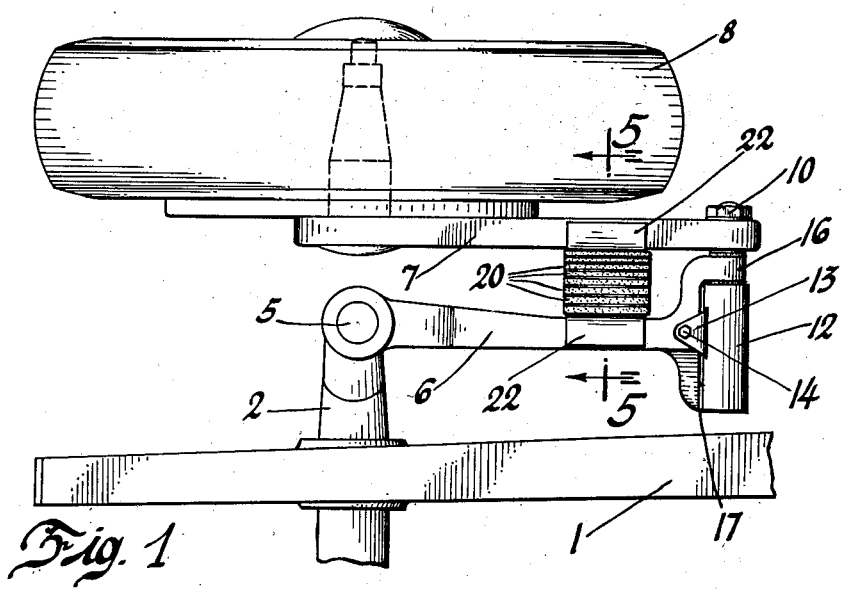
Figure 2:
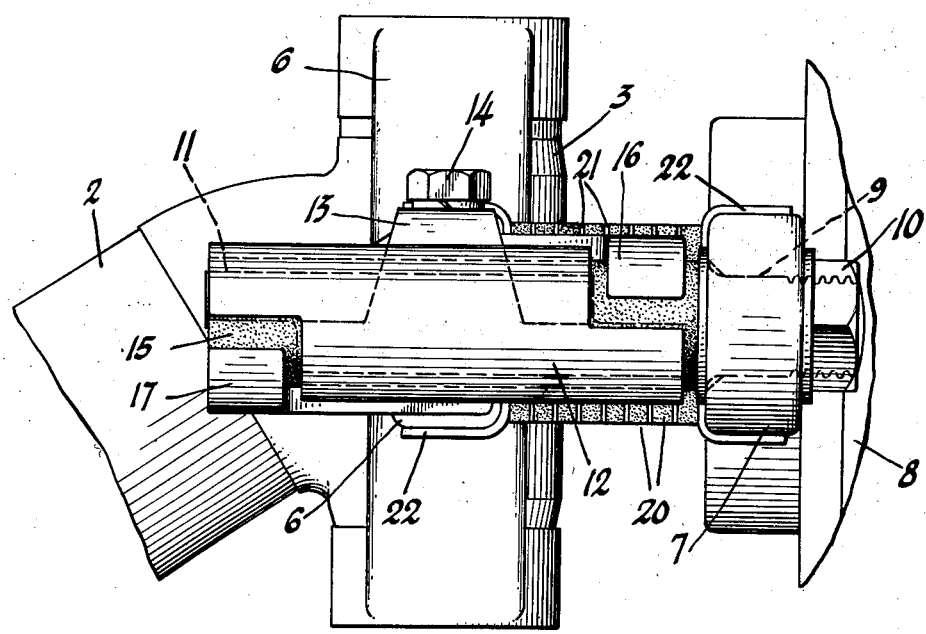
Figure 3:
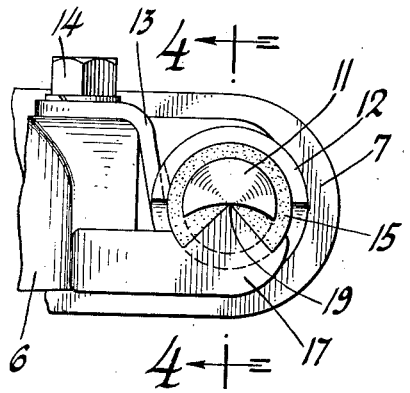
Figure 4:
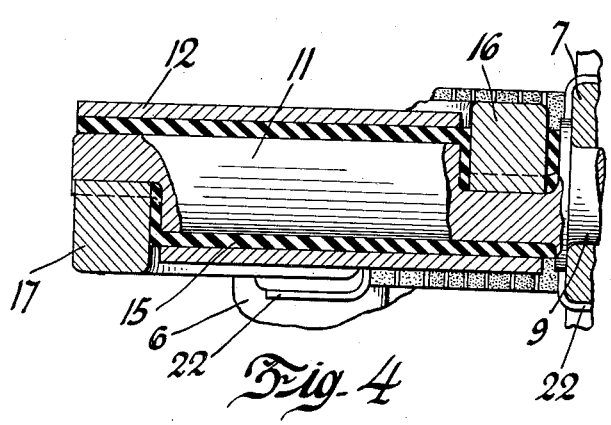
Figure 5:
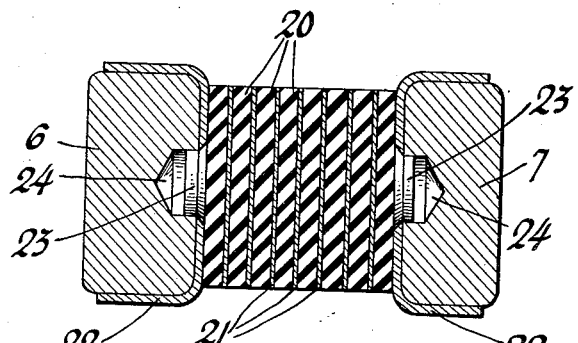
Figure 6:
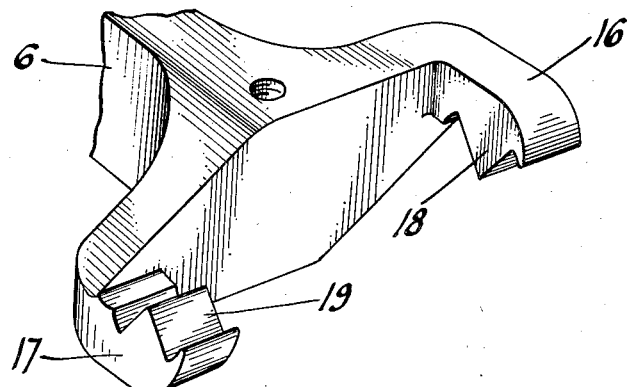

For a better understanding of the invention reference may be made to the accompanying drawings, wherein Figure 1 is a top plan view of an independent wheel suspension for the front end of a vehicle; Figure 2 is an enlarged view of the pivotal connection between the wheel supporting arm and the steering knuckle lever; Figure 3 is an end elevation of the joint; Figure 4 is a sectional view thereof taken on line 4—4 of Figure 3; Figure 5 is a sectional view taken on line 5—5 of Figure 1 of the rubber load carrying spring and Figure 6 is a detail perspective view of the knife edge bearing members.

Referring to the drawings the reference numeral 1 indicates a side member of the customary vehicle chassis frame with which is associated a transverse axle or frame member 2 having an apertured head 3 at the outer end thereof. A king pin 5 projecting through the eye 3 pivotally mounts the forked end of a rearwardly projecting knuckle or support arm 6 for swinging movement about a substantially vertical axis and to the opposite end to which is pivotally mounted on a transverse axis a wheel supporting arm 7 for the road wheel 8.

At its rearward end the arm 7 is provided with an aperture through which projects a shouldered extension 9, secured by a nut 10, of a laterally extending pin 11. The pin 11 is enclosed within a tubular housing 12, which for economy of manufacture may be sheet metal wrapped into cylindrical form with a projecting ear 13 for mounting by means of a stud 14 on the end of the arm 6. Interposed between the inner member or pin 11 and the outer member or tubular housing 12 is a sleeve 15 of rubber or other similar material, preferably molded and vulcanized or otherwise surface bonded to the inner and outer members for torsional deformation upon relative turning movements of the inner and outer members.

To relieve the rubber bushing from excessive loading the central pin is supported at opposite ends by the forked extensions 16 and 17 formed on the end of the lever 6. For this purpose the outer sleeve and central pin are cut away or recessed at opposite ends to substantially half moon shape as shown in the end view of Figure 3, so that the bearing surface provided intersects the axis of the pin, and the projections 16 and 17 are provided each with tapered lugs 18 and 19 which constitute knife edges to engage the opposite ends of the pin in axially spaced relation. As will be seen in the drawings the portion removed from the end of the pin nearest the wheel supporting arm is from above the axis of the pin while the recess at the remote end of the pin is formed on the underside and in like manner the knife edge bearing lug adjacent the wheel supporting arm depends downwardly, while the other knife edged lug projects upwardly. Thus the load is transferred to the pin through the oppositely disposed knife edge bearings and prevents canting of the pin as would otherwise tend to occur and the rubber sleeve or bushing 15 is thus freed in a large measure from gravity load and may be so designed that practically all of its elasticity is available for cushioning torsional stress.

As a main load supporting spring it is proposed to connect the relatively movable arms 6 and 7 by a load supporting spring in the form of a laminated structural unit comprising alternate layers of rubber and metal. The rubber may be in the form of a series of pads 20 interposed between sheet metal plates 21 and the whole vulcanized into a unitary assembly. The endmost plates indicated at 22 may be formed in any suitable way for attachment to the arms 6 and 7, respectively. As illustrated in the drawings the end plates 22 are of substantially U-shape to receive therein the arms 6 and 7 and each plate carries a riveted head or embossment 23 adapted to fit a locating recess 24 in the side of the cooperating lever arm.

As will be noted in the drawings the laminated structure is so arranged that the rubber is under shear stress in supporting the load and only the endmost metal plates are fastened to the relatively movable parts. The vulcanized surface bond between the thin rubber pads and metal plates is relied upon to maintain the parts in assembly and transmit the load from one pad to the other. The division of the rubber spring into a series of relatively thin pads stiffened by the intervening metal plates insures a uniform working of and an equal distribution of forces on the rubber particles of the several pads.

I claim:

1. Wheel suspension of the character described, relatively movable supporting and supported members, a resilient load transmitting device between said members, comprising a series of metal plates arranged beside each other in spaced apart relation and a series of relatively thin rubber pads in the spaces between said plates and vulcanized thereto to afford a laminated unit and means securing the endmost plates to said members with the laminations of the unit extending in the direction of relative movement, whereby the rubber pads are placed under shearing stress.

2. Resilient suspension for vehicles including a supported structure, a wheel carrying lever arm, means pivotally connecting said lever arm to the supported structure, a laminated leaf unit for transmitting the load between the lever arm and supported structure and comprised of rubber leaves and metal leaves arranged alternately in succession and surface bonded in face to face relation, with the plane of each leaf extending in the direction of movement of said lever arm about its pivotal connection, and means for connecting the endmost leaves only to the supported member and said lever arm.

3. Vehicle wheel suspension including a wheel carrying lever arm, a pivot pin projecting laterally therefrom, a housing forming a part of the supported structure, a sleeve of elastic deformable material interposed between the housing and pin, a pair of bearings associated with the housing in knife edge engagement with the pin in spaced apart relation, and resilient load carrying means yieldingly resisting movement of the lever about the axis of the pin.

4. A pivotal joint of the character described, including a pin, a pair of spaced apart bearings in knife edge engagement with the pin, a sleeve surrounding the pin in fixed relation to said bearings, and a bushing of elastic deformable material interposed between the sleeve and pin and adapted for torsional deformation upon relative pivotal movement of the pin and sleeve.

5. In vehicle wheel suspension, a wheel supporting arm having a pivot pin projecting laterally therefrom, a housing through which the pin projects for relative turning movement, a bushing of cushioning material between the pin and housing and a pair of bearing members associated with the housing in axially spaced relation, one thereof in knife edge engagement with the pin from above and the other projecting from below into knife edge engagement with the pin.

ERIC OLLE SCHJOLIN.